United States Patent Office 3,033,803
Patented May 8, 1962

3,033,803
PRODUCTION OF GLYCIDYL ETHERS
Herbert P. Price and William J. Belanger, Louisville, Ky., assignors to Devoe & Raynolds Company, Inc., Louisville, Ky., a corporation of New York
No Drawing. Filed Oct. 3, 1958, Ser. No. 765,022
10 Claims. (Cl. 260—2)

This invention relates to improvements in the production of glycidyl ethers, etc., and includes new processes of producing such ethers and improved products resulting therefrom.

The process of the present invention is one in which chlorohydrin ethers of aliphatic alcohols are first formed and are then subjected to dehydrohalogenation with an alkaline dehydrohalogenating agent, particularly caustic alkali, in the presence of epichlorohydrin as a solvent and reaction medium, to produce glycidyl ethers.

In the first step of the process, a monohydric alcohol, or a polyhydric alcohol, is reacted with epichlorohydrin in the presence of a catalyst to form the corresponding chlorohydrin ether, and with substantially complete reaction of the epichlorohydrin used to produce such ether. The process will differ somewhat, and the results will also differ, depending upon whether a monohydric alcohol is used or a polyhydric alcohol, and depending also, in the case of a polyhydric alcohol, on whether all of the hydroxyl groups are reacted to form chlorohydrin ether groups or only part of them are so reacted.

When a monohydric alcohol is used in the first step of the process, only a monochlorohydrin ether will be formed. But the process is an advantageous one for forming monochlorohydrin ethers and their subsequent dehydrohalogenation to form glycidyl ethers.

Where a dihydric alcohol is used, the chlorohydrin ether formed may be a monochlorohydrin ether or a dichlorohydrin ether or mixtures thereof, depending upon the proportion of epichlorohydrin used.

Where the polyhydric alcohol employed contains more than two hydroxyl groups, at least one of the hydroxyl groups will be reacted to form the chlorohydrin ether group, and the number of chlorohydrin ether groups can increase from one up to and including all of the hydroxyl groups contained in the particular polyhydric alcohol used. Thus, in the case of a trihydric alcohol, the complete trichlorohydrin ether can be formed, or the partial monochlorohydrin or dichlorohydrin ether, as well as mixtures.

This first step of reacting the alcohol with the epichlorohydrin is carried out with the use of a condensation catalyst, and particularly the use of a $BF_3$ catalyst such as a boron trifluoride ether complex or etherate. This reaction is an addition reaction between the epoxy group of the epichlorohydrin and the hydroxyl group or groups of the alcohol. In this reaction, no excess of epichlorohydrin is necessary in the formation of the chlorohydrin ether or ethers, and all, or substantially all, of the epichlorohydrin initially added to the alcohol is caused to react therewith.

In the second step of the process and after the formation of the chlorohydrin ethers, the boron fluoride catalyst is killed or deactivated by the use of minute amounts of alkali and water.

In the third step of the process, there is added to the chlorohydrin ether epichlorohydrin in an amount which is at least one mol of epichlorohydrin for each mol of the chlorohydrin ether; and advantageously a much larger proportion of epichlorohydrin is used. Up to as much as 10 to 20 mols of epichlorohydrin can be used.

Following the preceding step, there is added to the mixture of chlorohydrin ether and epichlorohydrin a dehydrohalogenating agent, and advantageously caustic alkali. The amount of alkali used is based on the chlorohydrin ether and is only a slight excess over that required to react with the chlorine of the chlorohydrin ether. The epichlorohydrin added and present during the dehydrohalogenation acts as a solvent or diluent or reaction medium, and does not enter into the reaction to any notable extent.

The final step of the process is one in which the glycidyl ether formed is separated from the epichlorohydrin and by-product salts.

The monohydric alcohols used in the present process for forming monoglycidyl ethers as the final products include alcohols such as ethyl, propyl and butyl alcohols, etc., or higher alcohols such as lauryl or soya alcohols, etc.

The polyhydric alcohols which can be used in the process include glycols and polyglycols containing at least two hydroxyl groups, at least one of which is a primary hydroxyl group, polyhydric alcohols containing more than two hydroxyl groups, such as trimethylol ethane, trimethylol propane, and pentaerythritol, etc. Polyhydric alcohols having a hydrocarbon chain between the hydroxyl groups are advantageous in imparting an aliphatic hydrocarbon element into the resulting glycide ether. Among such alcohols are ethylene glycol, butanediol, pentanediol, diethylene glycol, triethylene glycol, hexanetriol, glycerol, and various polyethylene glycols and polypropylene glycols, etc.

The polyhydric alcohols which can be used also include dihydroxy alkyl ethers of dihydric phenols, e.g., the dihydroxyethyl ethers of bisphenol, resorcinol, etc.

Where polyhydric alcohols are used with two or more than two hydroxyl groups, partial chlorohydrin ethers can be prepared by using an amount of epichlorohydrin insufficient to react with all of the hydroxyls. Thus, a monochlorohydrin ether or a dichlorohydrin ether of a trihydric alcohol can be produced. These partial chlorohydrin ethers still contain reactive hydroxyl groups which can be utilized for other reactions at a later stage. For example, the partial chlorohydrin ethers can, by dehydrohalogenation, be converted to partial glycidyl ethers such as monoglycidyl ethers or diglycidyl ethers which still contain one or more hydroxyl groups which can be utilized for subsequent reaction. These hydroxyls also increase the water solubility of the glycidyl ethers, making them suitable curing agents, in many cases, in aqueous systems, and in the preparation of aqueous dispersions.

The dehydrohalogenation of the chlorohydrin ethers is carried out, as above indicated, with the use of epichlorohydrin as a solvent and reaction medium and in the presence of an alkaline dehydrohalogenating agent sufficient in amount to convert the chlorohydrin ether to a glycide ether, or slightly in excess of that amount, but insufficient to react with any substantial amount of the epichlorohydrin present.

Different alkaline dehydrohalogenating agents can be used, including alkali metal complexes and salts such as sodium silicate, sodium aluminate, sodium zincate, etc. But it is one advantage of the present process, in which epichlorohydrin is used as a solvent or diluent, that caustic alkali can be used for the dehydrohalogenation without objectionable further reaction or with a minimum of further reaction during or after the formation of the glycidyl ethers. The use of epichlorohydrin as a solvent and caustic alkali as a dehydrohalogenating agent enables the glycide ethers to be produced largely in a monomeric state and with a minimum or limited amount of further reaction or condensation or polymerization during the dehydrohalogenation.

The monoglycide ethers of the monohydric alcohols can be used for varying purposes where reaction through an epoxide group is desired. Thus, glycidyl ether of e.g. butyl alcohol is a valuable reactive diluent for admixture with epoxy resins, serving as a solvent and reducing the viscosity of the resins and also reacting therewith during the curing operation.

The partial glycidyl ethers of polyhydric alcohols which contain both glycide and free alcoholic hydroxyl groups can be used for purposes where reaction is desired, both through the hydroxyl groups and the epoxide groups, including admixture with epoxy resins and other resins.

The diglycide ethers of the dihydric alcohols and the other complete glycide ethers of the other polyhydric alcohols are useful for various purposes, including use as epoxy resins in many cases or for admixture with epoxy resins. For example, these aliphatic polyglycidyl ethers can advantageously be used in admixture with epoxy resins from polyhydric phenols to impart aliphatic properties in combination with the aromatic properties imparted by the epoxy resins with which they are used.

The following examples illustrate the production of glycidyl ethers of aliphatic monohydric and polyhydric alcohols by first reacting the alcohol with epichlorohydrin with the use of a BF₃ catalyst to form the chlorohydrin ether, and subsequently dehydrohalogenating with the use of added epichlorohydrin as a solvent and caustic alkali as a dehydrohalogenating agent. In the chlorohydrins formed, most of the chlorine is active chlorine, while some small amount of the chlorine may be present as inactive chlorine. These terms, as used in the following examples, are defined as follows:

The active chlorine is defined as the chlorine on a carbon atom adjacent to a carbon atom containing a hydroxyl group, as follows:

(1)   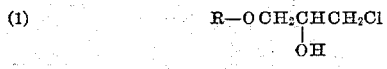

This compound is easily dehydrohalogenated to give an epoxide compound.

Inactive chlorines are formed by the addition of epichlorohydrin to the hydroxyl group in the above compound.

(2)   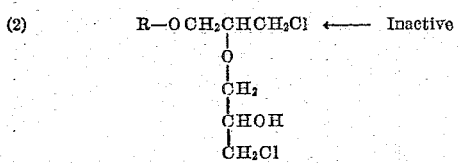 ← Inactive

The above labeled chlorine cannot be removed to form an epoxide group since no hydroxyl is present on an adjacent carbon.

The process will be further illustrated by the following specific examples, but it will be understood that the invention is not limited thereto. Examples 1–6 relate to the production of the chlorohydrin ethers; while Examples 7–11 describe the production of the glycidyl ethers from the chlorohydrin ethers.

The use of epichlorohydrin as a solvent during the dehydrohalogenation enables sodium hydroxide to be used as the dehydrohalogenating agent in amount equivalent to or slightly in excess of the active chlorine of the chlorohydrin, as illustrated by the following examples. The amount of epichlorohydrin used in the dehydrohalogenating process can be varied, e.g. from 1 mol of epichlorohydrin to 1 mol of the chlorohydrin ether, up to 10 mols of epichlorohydrin to 1 mol of chlorohydrin ether. A ratio of about 4–1 was found advantageous in many cases.

EXAMPLE 1

To a one liter flask equipped with stirrer, thermometer, condenser and addition tube was added 180 grams (2 mols) of 1,4-butanediol and 1 cc. of BF₃ etherate (47% BF₃). This solution was heated to 60° C. where dropwise addition of 370 grams (4 mols) of epichlorohydrin was begun. The epichlorohydrin was added over a period of two hours and fifteen minutes, the temperature being controlled between 60–70° C. by external cooling. After the exothermic reaction was over, the temperature was raised to 75° C. to insure complete reaction. This product analyzed 21.1% active chlorine, 25.8% total chlorine.

EXAMPLE 2

To a one liter flask, equipped as in Example 1, was added 307 grams (2.29 mols) of trimethylol propane. The temperature was raised to 56° C. to melt the TMP, at which point heat was removed and 1 cc. of BF₃ etherate was added. Dropwise addition of epichlorohydrin, 424 grams (4.58 mols) was begun and continued over a period of three hours. The temperature of the exothermic reaction was controlled between 60–70° C. by external cooling and rate of epichlorohydrin addition. This product had an active chlorine content of 18.9%, total chlorine 22.2%.

EXAMPLE 3

To a one liter flask, equipped with condenser, stirrer, and thermometer was added 300 grams (½ mol) of polyethylene glycol 600 and 92.5 grams epichlorohydrin (1 mol). When solution was attained, 1 cc. of BF₃ etherate was added. The temperature of the reaction was controlled between 25–35° C. for three hours and then was raised to 50° C. to insure complete reaction. The product contained 8.2% active chlorine, 9.0% total chlorine.

EXAMPLE 4

To a one liter flask equipped as in Example 1 was added 100 grams glycerine (1.09 mols) 100 grams trimethylol propane (0.75 mol), 25 grams pentaerythritol (0.18 mol). This mixture contained 6.2 equivalents of hydroxyls. Heat was applied and the temperature was raised to 130° C. to melt and dissolve the components. The solution cooled to 99° C. where 1 cc. of BF₃ etherate was added and dropwise addition of 377 grams (4.08 mols) of epichlorohydrin was added over a one hour period. The ratio of epichlorohydrin to hydroxyls being 2 to 3 corresponds to the formation of the dichlorohydrin ether. The exothermic reaction was controlled at 128–130°

C. by the rate of epichlorohydrin addition. The product contained 19.5% active chlorine, 24% total chlorine.

EXAMPLE 5

To a one liter flask equipped as in Example 1 was added 180 grams (2 mols) of 1,4-butanediol and 1 cc. of BF$_3$ etherate. This solution was heated to 60° C. were dropwise addition of 185 grams (2 mols) of epichlorohydrin was added over a period of 1 hour and fifteen minutes, the temperature being controlled between 60–70° C. by external cooling. After the exothermic reaction was over, the temperature was raised to 80° C. to insure complete reaction. This product contained 18.4% active chlorine, 19.4% total chlorine. The proportions used in this example are those for the formation of the monochlorohydrin ether of the dihydric alcohol.

EXAMPLE 6

The alcohol used was soya alcohol, corresponding to the soya bean oil fatty acids, and produced therefrom by reduction.

To 532 grams (2 mols) of soya alcohol containing 1 cc. of BF$_3$ etherate was added 185 grams (2 mols) of epichlorohydrin gradually over a period of one and a half hours and with the temperature controlled between 65–75° C. The resulting monochlorohydrin ether of the soya alcohol contained 8.4% active chlorine and 9.9% total chlorine.

EXAMPLE 7

To a two liter flask equipped with a stirrer, condenser and thermometer was added 521 grams (1.9 mols) of the dichlorohydrin ether of butanediol (Example 1) and 1 gram of NaOH dissolved in 5 cc. of water to complex the BF$_3$ catalyst. To this was added 700 grams (7.6 mols) of epichlorohydrin, total epichlorohydrin to dichlorohydrin ratio being 4 mols to 1. Sodium hydroxide (151 grams, 3.8 mols) equivalent to the total chlorine in the chlorohydrin ether was added in four increments over a period of one hour. The temperature was controlled between 70–85° C. during these additions. Little exotherm was encountered during these additions until the last increment was added where the temperature rose to 98° C. After this exotherm was over, the water-epichlorohydrin azeotrope was removed to a pot temperature of 126° C. The salt was filtered from the product solution on a Buchner funnel and was washed with benzene. The solvents were distilled from the product to 170° C. at 65 mm. The product in 111% yield (427 grams) based on the glycol had a weight/epoxide of 147, total chlorine 7.3%, active chlorine 1.6% and Gardner viscosity A$_2$.

EXAMPLE 8

To a two liter flask equipped as in Example 7 was added 484 grams (1.5 mols) of the dichlorohydrin ether of trimethylol propane (Example 2) and 1 gram of NaOH in 5 cc. of water to complex the catalyst. To this was added 555 grams (6 mols) of epichlorohydrin. Sodium hydroxide (132 grams, 3.3 mols), in 10% excess of total chlorine of chlorohydrin, was added in four increments over a period of 1.5 hours. The temperature was controlled between 70–90° C. with the exotherm on the last addition going to 100° C. After the final exotherm subsided, the water-epichlorohydrin azeotrope was removed to a pot temperature of 127° C. The salt was removed on a Buchner funnel and washed with benzene. The product was recovered in 117% yield (432 grams) and had a weight/epoxide of 164, total chlorine 5%, active chlorine 1.4%, and Gardner viscosity J.

EXAMPLE 9

To a two liter flask equipped as in Example 7 was added 565 grams of the mixed chlorohydrin ethers of pentaerythritol, glycerine and trimethylol propane (Example 4) and 1 gram NaOH in 5 cc. of water to complex the BF$_3$ catalyst. To this was added 620 grams epichlorohydrin (6.7 mols) and 135 grams NaOH in five increments over a period of 2⅓ hours. The temperature was controlled between 70–90° C. during these additions. After the final exotherm had subsided the water-epichlorohydrin azeotrope was removed to a pot temperature of 126° C. The salt was filtered out on a Buchner funnel and washed with benzene. The solvents were distilled to 166° C. at 55 mm. The product in 109% yield (467 grams) had a weight/epoxide of 193, total chlorine 7.6%, active chlorine 2.2%, and Gardner viscosity T–U.

EXAMPLE 10

To a two liter flask equipped as in Example 7 was added 356 grams (1.95 mols) of the monochlorohydrin ether of butanediol (Example 5) and 1 gram of NaOH in 5 cc. of water to complex the BF$_3$ catalysts. To this was added 540 grams epichlorohydrin (5.85 mols) and 77 grams NaOH in three increments over a period of 25 minutes. The temperature was controlled between 70–80° C. during these additions. After the final exotherm had subsided the water-epichlorohydrin azeotrope was removed to a pot temperature of 125° C. The salt was removed by filtration on a Buchner funnel and washed with benzene. The solvents were distilled to 150° C. at 40 mm. The product in 102% yield (288 grams) had a weight/epoxide of 169, total chlorine 3.0%, active chlorine 1.1% and Gardner viscosity A$_3$–A$_2$.

EXAMPLE 11

The monochlorohydrin ether of the soya alcohols of Example 6 were treated with 1 gram NaOH and 5 cc. water to deactivate the BF$_3$ catalyst. 709 grams (1.97 mols) of the soya alcohol chlorohydrin ether was admixed with 730 grams (7.9 mols) of epichlorohydrin corresponding to a ratio of 4 mols of epichlorohydrin to 1 mol of chlorohydrin ether. Sodium hydroxide was added in three increments and in total amount of 79 grams (1.97 mols), with temperature maintained between 70–90° C., over a period of one hour. The water-epichlorohydrin azeotrope was removed by heating to a pot temperature of 126° C. The resulting solution was then filtered and the excess epichlorohydrin distilled by heating to a pot temperature of 160° C. at 28 mm.

The product produced had a weight/epoxide of 452 (theoretical 322 for the monochlorohydrin ether), total chlorine 3.7%, active chlorine 1.7%, and Gardner viscosity A$_3$.

In a similar way, other glycidyl ethers of other monohydric and polyhydric alcohols can be prepared. The following table gives the results of the preparation of a number of dichlorohydrin ethers and of the diglycidyl ethers produced therefrom by dehydrohalogenation. In this table, the first column illustrates the polyhydric alcohol used, the next two columns indicate respectively the active chlorine and the total chlorine of the dichlorohydrin ether produced therefrom; the next column indicates the molecular ratio of epichlorohydrin to chlorohydrin ether used as a solvent; and the last five columns show the analysis of the epoxide resin produced. In the columns headed "Wt./Epoxide," the column headed "Act." shows the actual weight per epoxide group, while the column headed "Theo." indicates the theoretical weight per epoxide group on the assumption that the product is a diglycide ether of the polyhydric alcohol. The total chlorine and the active chlorine in the different samples are given as well as the Gardner viscosity of the product.

Table I

| Polyhydric Alcohol | Dichlorohydrin Ether | | Mole Ratio of Epi to Chlorohydrin Ether | Resin Analysis | | | | |
|---|---|---|---|---|---|---|---|---|
| | Percent A.C.l | Percent T.Cl | | Wt./Epoxide | | T.Cl | A.Cl | Gardner Visc. |
| | | | | Act. | Theo. | | | |
| Ethylene Glycol | 22.4 | 28.8 | 4/1 | 145 | 87 | 9.5 | 2.2 | A-2 |
| 1,4 Butanediol | 21.1 | 25.8 | 4/1 | 147 | 101 | 7.3 | 1.6 | A-2 |
| 1,3 Butanediol | 20.3 | 25.8 | 4/1 | 155 | 101 | 8.2 | 1.8 | A-2 |
| 2,3 Butanediol | 19.4 | 25.8 | 4/1 | 164 | 101 | 9.3 | 1.5 | A-3 |
| 2 Butenediol 1,4 | 21.2 | 26.0 | 4/1 | 153 | 100 | 8.0 | 1.8 | A-2 |
| 1,5 Pentanediol | 20.2 | 24.6 | 4/1 | 151 | 108 | 7.2 | 2.0 | A-3 |
| Diethylene Glycol | 19.9 | 24.4 | 8/1 | 159 | 109 | 6.7 | 1.7 | A-1 |
| Triethylene Glycol | 17.6 | 21.2 | 8/1 | 180 | 131 | 5.8 | 2.0 | A-2 |
| Carbowax 200 | 15.4 | 18.4 | 8/1 | 200 | 156 | 4.9 | 1.4 | A-1 |
| Tripropylene Glycol | 15.9 | 18.8 | 4/1 | 237 | 152 | 5.8 | 1.8 | A-1 |
| Polyethoxydiol | 12.6 | 14.2 | 4/1 | 276 | 214 | 3.9 | 1.3 | I |
| Carbowax 600 | 7.9 | 9.0 | 8/1 | 419 | 356 | 2.0 | 1.0 | D-E |
| Polybutylene-Glycol 1000 | 5.35 | 6.0 | 8/1 | 765 | 556 | 2.4 | 1.1 | G |
| Glycerine | 21.4 | 25.6 | 4/1 | 167 | 102 | 9.2 | 2.5 | N |
| Hexanetriol | 19.1 | 22.2 | 4/1 | 175 | 123 | 5.7 | 1.7 | H |
| Hexanetriol[1] | 20.2 | 25.8 | 6/1 | 167 | 101 | 8.7 | 2.5 | E |
| Trimethylol Propane[1] | 18.9 | 22.2 | 4/1 | 164 | 123 | 5.0 | 1.4 | J |
| Trimethylol Propane | 20.3 | 25.8 | 6/1 | 149 | 101 | 8.9 | 2.5 | E |
| 11.2% Pentaerythritol 44.4% Glycerine 44.4% Trimethylol Propane | 19.5 | 24.0 | 3.4/1 | 193 | 114 | 7.6 | 2.2 | T-U |
| 1,4 Butanediol[2] | 18.4 | 19.4 | 3/1 | 169 | 146 | 3.0 | 1.1 | A₃-A₂ |

[1] Triglycidyl Ethers
[2] Monoglycidyl Ether

These glycidyl ethers are useful for many purposes, including compounding with other epoxy resins, etc. The diglycidyl ethers are capable of curing, e.g., by using diethylene triamine or metaphenylene diamine as the curing agent.

Where the polyhydric alcohols which are reacted with epichlorohydrin to form the chlorohydrin ethers contain more than two alcoholic groups, they can be reacted with approximately one or two mols of epichlorohydrin to form a partial chlorohydrin ether which is mainly a mono- or dichlorohydrin ether, leaving the other hydroxyl group or groups unreacted. With these polyhydric alcohols, it is also possible to produce e.g. trichlorohydrin ethers of trihydric alcohols, as well as partial chlorohydrin ethers. And when these chlorohydrin ethers are subjected to dehydrohalogenation, the resulting glycidyl ethers may be partial ethers such as monoglycidyl, or diglycidyl ethers of a trihydric alcohol, or they may be complete ethers such as triglycidyl ether of a trihydric alcohol.

These glycidyl ethers of polyhydric alcohols can be cured by heating with an amine catalyst such as diethylene triamine, and they can also be compounded with other resins before curing.

It is one advantage of the partial glycidyl ethers of polyhydric alcohols, prepared by using an insufficient amount of epichlorohydrin to react with all the hydroxyl groups, that they contain reactive hydroxyl groups which can be utilized for preparing other derivatives. Also, these hydroxyl groups increase the water solubility of the glycidyl ethers, making them suitable, e.g. as curing agents in aqueous systems.

The partial and complete glycidyl ethers of trimethylol ethane, trimethylol propane and pentaerythritol were prepared by the method illustrated by the above examples. In preparing the chlorohydrin ethers of trimethylol propane, the trimethylol propane was heated to 60–65° C., above its melting point, before the epichlorohydrin was added. In preparing the chlorohydrin ethers of the higher melting trimethylol ethane and pentaerythritol, a somewhat modified procedure was used. The trimethylol ethane was heated to 100–110° C., the $BF_3$ catalyst was added, and dropwise addition of epichlorohydrin was begun. At first, a composite mass, and then a slurry was formed. As the epichlorohydrin reacted, the unreacted polyhydric alcohol dissolved in the chlorohydrin, so that, when one-third to one-half the epichlorohydrin was added, a homogeneous solution was obtained.

The reaction with pentaerythritol was conducted in the same manner but at a temperature of 150° C. This temperature is above the boiling point of the epichlorohydrin, but pressure is not necessary to effect this reaction. If the epichlorohydrin is added at a slow rate with agitation, it reacts with the pentaerythritol as soon as it comes in contact with it, and refluxing may not be necessary; but refluxing can be provided where necessary to avoid loss of epichlorohydrin.

The following table shows the data on these compounds:

Table II

| Polyhydric Alcohol | Chlorohydrin | | | Mole Ratio of Epi to Chlorohydrin Ether | Resin Analysis | | | | |
|---|---|---|---|---|---|---|---|---|---|
| | Type | Active Cl Percent | Total Cl Percent | | Wt./Epoxide | | Total Cl | Active Cl | Gardner Viscosity |
| | | | | | Actual | Theor. | | | |
| TME | Di | 19.4 | 23.3 | 4/1 | 160 | 116 | 5.5 | 1.4 | J |
| TME | Tri | 20.9 | 25.8 | 6/1 | 148 | 96 | 9.0 | 2.6 | D-E |
| TMP | Mono | 14. | 15.7 | 3/1 | 219 | 190 | 2.6 | 1.1 | T-U |
| TMP | Di | 18.9 | 22.2 | 4/1 | 164 | 123 | 5.0 | 1.4 | J |
| TMP | Tri | 20.4 | 25.8 | 6/1 | 145 | 101 | 8.1 | 2.5 | D-E |
| PE | Di | 18.3 | 22.1 | 6/1 | 195 | 124 | 7.7 | 3.3 | Z₃-Z₄ |
| PE | Tri | 20.1 | 25.8 | 6/1 | 163 | 101 | 9.2 | 3.4 | V-W |
| PE | Tetra | 19.8 | 28.0 | 4/1 | 194 | 90 | 11.6 | 2.5 | X-Y |

In this table, the polyhydric alcohol is abbreviated "TME" (trimethylol), "TMP" (trimethylol propane) and "PE" (pentaerythritol). The column headed "Type" indicates whether the mono-, di- tri-, or tetra-chlorohydrin ether was formed. The active and total chlorine is indicated, together with the ratio of epichlorohydrin used during the dehydrohalogenation, while the resin analysis corresponds to the similar columns of Table I.

These glycidyl ethers are capable of curing e.g. with diethylene triamine as a curing agent, and can be used for compounding with other resins, etc.

Dihydric alcohols which contain an intermediate aromatic group can also advantageously be converted into chlorohydrin ethers which are dehydrohalogenated to produce glycidyl ethers. The dihydroxyalkyl ethers or adducts of dihydric phenols such as bisphenol or resorcinol, etc., can readily be prepared, e.g. by reaction of 2 mols of ethylene chlorohydrin with 1 mol of dihydric phenol, with the use of caustic soda as the condensing or dehydrohalogenating agent, or by reacting the dihydric phenol with ethylene carbonate, using potassium carbonate as the catalyst. The resulting dihydroxy dialkyl ethers can be converted to the chlorohydrin ethers following the procedure previously described, and the chlorohydrin ethers then dehydrohalogenated to form the glycidyl ethers.

The following example illustrates the production of glycidyl ethers from such dihydric alcohols:

EXAMPLE 12

To a two liter flask equipped with a condenser, thermometer, stirrer and dropping funnel was added 616 grams of the dihydroxyethyl ether of bisphenol (2 mols based on percent OH=11.05). This material was heated to 100° C. in order to melt it and 25 grams of epichlorohydrin was added to it. At 79° C. 1 cc. of $BF_3$ etherate (47% $BF_3$) was added. The reaction exothermed to 83° C. Gradual addition of epichlorohydrin was begun at this point. The temperature was controlled between 80-85° C. by the rate of epichlorohydrin addition and by the application of an external cold water bath. All the epichlorohydrin (370 grams, 4 mols) was added over a period of one hour. Five grams of water was then added. This material analyzed as containing 10.9% active chlorine, 14.4% total chlorine.

This dichlorohydrin ether (1 mol based on weight per active chlorine, 493 grams) was dissolved in 740 grams of epichlorohydrin making a total of all epichlorohydrin (added and combined) equal to 10 mols. To this was added 88 grams (2 mols+10 wt. percent excess) of sodium hydroxide in two portions. The first portion (40 grams) was added and the temperature was raised to 90° C. with little exotherm. The mixture was cooled to 71° C. when the remaining sodium hydroxide was added. The temperature was then raised to distill the water, epichlorohydrin azeotrope. At a pot temperature of 125° C., the solution was cooled, the salts were filtered out and solvents were distilled to a pot temperature of 180° C. at 44 mm. pressure. 457 grams of product was recovered (108% yield) with a weight/epoxide of 295, total chlorine content 4.7%, active chlorine 0.7%. The Gardner-Holdt viscosity was Z-1 to Z-2, Brookfield viscosity 3100 c.p.s.

We claim:

1. The process of producing glycidyl ethers which comprises forming a mixture of epichlorohydrin and a chlorohydrin ether of an alcohol, the epichlorohydrin being present in an amount equivalent to at least one mol per mol of chlorohydrin ether, and effecting dehydrohalogenation with the use of caustic alkali in amount sufficient to dehydrohalogenate the chlorohydrin ether.

2. The process of producing glycidyl ethers of polyhydric alcohols which comprises forming a mixture of epichlorohydrin and a chlorohydrin ether of a polyhydric alcohol, the epichlorohydrin being present in an amount equivalent to at least one mol per mol of chlorohydrin ether, and effecting dehydrohalogenation with the use of caustic alkali in amount sufficient to dehydrohalogenate the chlorohydrin ether.

3. The process of producing diglycidyl ethers of dihydric alcohols which comprises forming a mixture of epichlorohydrin and a dichlorohydrin ether of a dihydric alcohol, the epichlorohydrin being present in an amount equivalent to at least one mol per mol of chlorohydrin ether, and effecting dehydrohalogenation with the use of caustic alkali in amount sufficient to dehydrohalogenate the chlorohydrin ether.

4. The process of producing partial glycidyl ethers of polyhydric alcohols which comprises forming a mixture of epichlorohydrin and a partial chlorohydrin ether of a polyhydric alcohol, containing at least one free alcoholic hydroxyl group, the epichlorohydrin being present in an amount equivalent to at least one mol per mol of chlorohydrin ether, and effecting dehydrohalogenation with the use of caustic alkali in amount sufficient to dehydrohalogenate the chlorohydrin ether.

5. The process of producing glycidyl ethers of alcohols which comprises reacting the alcohol with epichlorohydrin in amount sufficient to form a chlorohydrin ether and in the presence of a boron fluoride catalyst, inactivating the catalyst at the end of such reaction, admixing with the chlorohydrin ether an amount of epichlorohydrin in the proportion of at least one mol of epichlorohydrin per mol of chlorohydrin ether, effecting dehydrohalogenation with the use of caustic alkali in amount sufficient to dehydrohalogenate the chlorohydrin ether, and separating the resulting glycidyl ether from the epichlorohydrin and byproduct salt.

6. The process according to claim 5 in which the amount of epichlorohydrin used in the dehydrohalogenation is from about 4 to 10 mols of epichlorohydrin per mol of chlorohydrin ether.

7. The process according to claim 5 in which the alcohol is a monohydric alcohol and the glycidyl ether formed is a monoglycidyl ether.

8. The process according to claim 5 in which the alcohol is a polyhydric alcohol and the amount of epichlorohydrin reacted therewith is at least sufficient to produce a monochlorohydrin ether, but insufficient to react with all of the alcoholic groups of the polyhydric alcohol.

9. The process according to claim 5 in which the alcohol is a dihydric alcohol and the amount of epichlorohydrin reacted therewith is sufficient to produce a dichlorohydrin ether.

10. The process according to claim 9 in which the amount of epichlorohydrin used in the dehydrohalogenation is from about 4 to 10 mols of epichlorohydrin per mol of chlorohydrin ether.

References Cited in the file of this patent

UNITED STATES PATENTS

| | | |
|---|---|---|
| 2,467,171 | Werner et al. | Apr. 12, 1949 |
| 2,512,996 | Bixler | June 27, 1950 |
| 2,538,072 | Zech | Jan. 16, 1951 |
| 2,548,447 | Shokal et al. | Apr. 10, 1951 |
| 2,581,464 | Zech | Jan. 8, 1952 |
| 2,712,000 | Zech | June 28, 1955 |
| 2,841,595 | Pezzaglia | July 1, 1958 |

UNITED STATES PATENT OFFICE

CERTIFICATE OF CORRECTION

Patent No. 3,033,803             May 8, 1962

Herbert P. Price et al.

It is hereby certified that error appears in the above numbered patent requiring correction and that the said Letters Patent should read as corrected below.

Column 5, line 7, for "were" read -- where --; column 7, in the Table, first column, line 17, after "Propane" strike out footnote "1", and insert the same after "Propane" in line 18, same Table; column 8, line 73, for "(trimethylol)" read -- (trimethylol ethane) --.

Signed and sealed this 28th day of August 1962.

(SEAL)
Attest:

ESTON G. JOHNSON
Attesting Officer

DAVID L. LADD
Commissioner of Patents